Oct. 18, 1966     K. V. KORDESCH ET AL     3,280,014
METHOD OF PRODUCING ELECTRICITY AND CHEMICALS
Filed Oct. 28, 1960     2 Sheets-Sheet 1

INVENTORS
KARL V. KORDESCH
JOHN F. YEAGER
JOSEPH S. DERESKA

BY *John F. Hohmann*
ATTORNEY

INVENTORS
KARL V. KORDESCH
JOHN F. YEAGER
JOSEPH S. DERESKA

BY John F. Hohmann
ATTORNEY

United States Patent Office 3,280,014
Patented Oct. 18, 1966

3,280,014
METHOD OF PRODUCING ELECTRICITY AND CHEMICALS
Karl V. Kordesch, Lakewood, John F. Yeager, Berea, and Joseph S. Dereska, Parma, Ohio, assignors to Union Carbide Corporation, a corporation of New York
Filed Oct. 28, 1960, Ser. No. 65,779
6 Claims. (Cl. 204—73)

This invention relates to the conversion of chemical fuels and oxidants in a fuel cell wherein electrical power and useful chemical products are simultaneously obtained.

In recent years, the low temperature fuel cell employing aqueous electrolyte has been a technically feasible device for supplying useful electrical power by means of continuous electrochemical conversion of an oxidizable fuel and a reducible oxidant. Fuels other than gaseous hydrogen have been found to undergo hydrogen ion-producing reactions at catalyzed fuel cell electrodes, for example, alcohols such as methanol, ethanol, etc., and hydrocarbons such as cyclohexane, deca- and tetrahydronaphthalene. Oxidants other than gaseous oxygen or air have been reduced at fuel cell electrodes, for example, m-dinitrobenzene, chloranil, hexachloromelamine, etc.

The main object of the subject invention is to provide means for the production of useful chemical products and electrical power, which means are associated with fuel cells.

Another object of the present invention is to provide novel apparatus capable of producing power and chemicals of improved value.

A further object of this invention is to provide an apparatus wherein the rate of formation, the nature and the purity of the final product may be accurately controlled.

A further and more restricted object of the present invention is to provide novel means for converting alcohols to halogenated hydrocarbons.

Another object of the invention is to provide new and improved means for converting alcohols to their carbonyl derivatives.

An additional object of this invention is to provide new and improved means for dehydrogenating hydrocarbons.

A still further object of the invention is to provide new and improved means for reducing quinonic, N-halogen and aromatic nitro compounds to their respective derivatives.

These and other related objects, features and advantages of the invention will become more apparent as the description thereof proceeds, particularly when taken in conjunction with the accompanying drawing wherein.

The reactor apparatus, with modifications indicated hereinbelow, consists essentially of a fuel cell, features of which are disclosed and claimed in the co-pending applications of K. Kordesch et al., Serial Nos. 764,342 and 764,359, both filed September 30, 1958, and 788,390, filed January 22, 1959, all now abandoned. Where porous metal electrodes are used in the fuel cells instead of carbonaceous electrodes, such metal electrodes may be prepared by the process disclosed and claimed in the co-pending application of R. R. Witherspoon, Serial No. 27,288, filed on May 6, 1960, now abandoned. At the anode or fuel electrode of these cells, the following reaction takes place: fuel=ions+electrons. At the cathode or oxidizing electrode, the reaction is: oxidant+electrons=ions.

The cost of fuel cell operation can be reduced by providing saleable products in addition to electrical power. The rate of formation of these products, as well as their nature, can be controlled by suitable regulation of fuel cell operating conditions.

In the practice of the invention, porous electrically conductive carbon or metal electrodes having a highly active catalyzed surface are immersed in a suitable acid, neutral, or alkaline electrolyte at approximately 70° to 80° C. and are supplied with an oxidant such as air, oxygen, chlorine or a reducible organic compound and an oxidizable fuel such as hydrogen or an organic compound capable of undergoing a hydrogen ion-producing reaction upon oxidation to form the desired product or products. The main reaction product is formed in the electrolyte by the electrochemical reaction between fuel and oxidant at the electrode-electrolyte interface. The product is then removed from the electrolyte by suitable recovery techniques adapted to the physical and chemical nature of the product.

In the case of gaseous products or liquids more volatile than the electrolyte, distillation apparatus may be used with the reactor. The apparatus may be a separate unit into which the electrolyte carrying the product may be circulated and returned to the cell after removal of the product. In the case of products which are volatile at the operating temperature of the fuel cell, a condenser may be conveniently attached directly to the cell to cool and condense the volatile substance as it is liberated.

Figure 1:
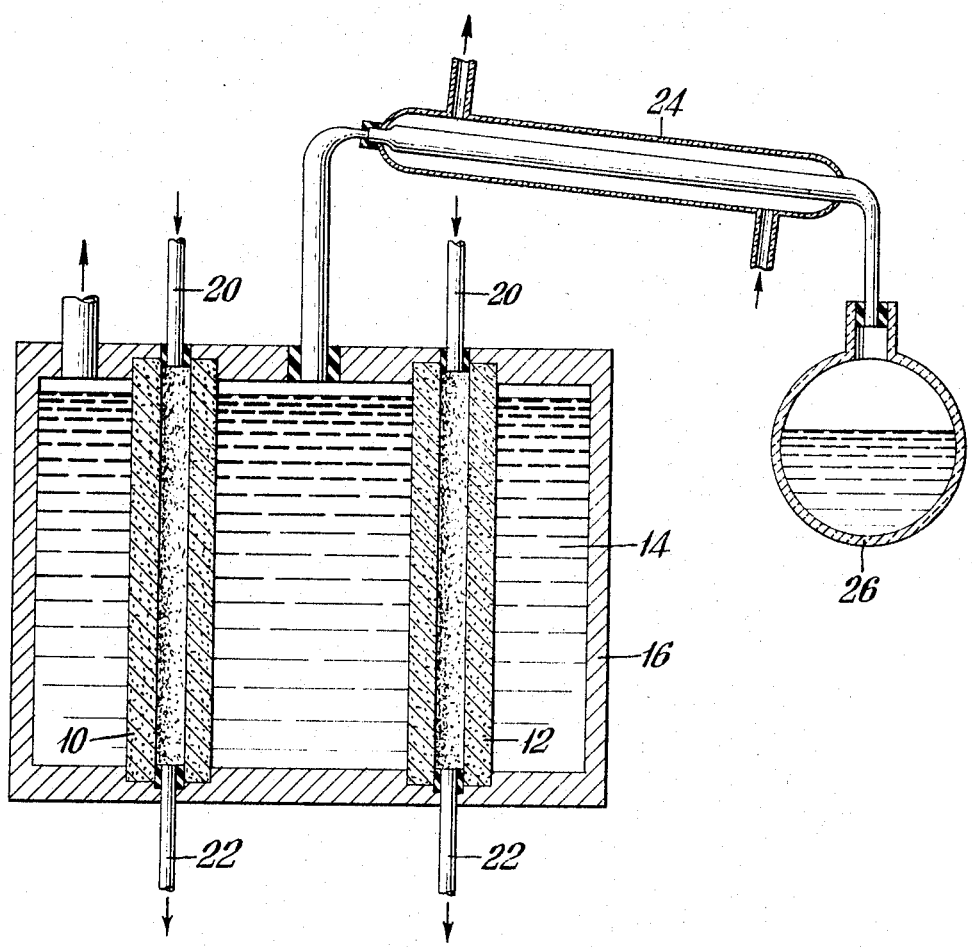
FIGURE 1 is a schematic view of one embodiment of apparatus according to the present invention and suitable for the production of volatile products.

FIGURE 1, schematically illustrates a simple apparatus for carrying out this form of the subject invention. The apparatus comprises tubular porous, activated carbon oxidizing electrode 10 and negative fuel electrode 12, both immersed in a common alkaline electrolyte 14 contained in alkali-resistant container 16.

The carbon electrodes for the present embodiment and for the other embodiments of the invention may be prepared in the following manner. Carbon shells are first extruded from a mixture composed, for example, of 100 parts of finely divided carbon black, 63 parts of soft pitch and 3 parts of fuel oil. The extruded tubes are then baked at about 1000° C. for about 6 hours. The tubes at that point show a porosity of the order of 18 to 20 percent, as measured by water saturation. Porosity of the carbon tubes is then increased about 25 percent by heating at 850 to 950° C. in a carbon dioxide or steam atmosphere for about seven hours. This process activates the carbon tubes. Next a catalytic solution suitably a 0.1 M solution of cobaltous nitrate and aluminum nitrate is applied to the electrodes and decomposed by heat to form a spinel, such as $CoO \cdot Al_2O_3$. During this operation a final porosity of 30 to 35 percent is attained. To the negative electrode is applied a coating of a suitable hydrogen ionization catalyst consisting of a finely divided metal selected from the group consisting of platinum, rhodium, iridium, palladium, ruthenium and mixtures thereof. For better results the electrode surfaces are coated with a semi-permeable film of sodium carboxymethyl cellulose, polyvinyl alcohol or acetyl cellulose. Other techniques may be used to prepare these carbon electrodes. Similarly, any number of porous metal electrodes may be used in the place of carbon electrodes.

When air or oxygen and an alcohol in vapor or liquid form are supplied through inlets 20 to the positive and negative electrodes, respectively, an oxidation product is formed within container 16, and is distilled out of the cell into condenser 24 to be collected in receiving vessel 26. Excess feed material leaving through outlets 22 is freed from water vapor and recirculated to conductive inlets 20, which also serve as electrical terminals for the cell.

As an example of this embodiment of the invention, a fuel cell consisting of two catalyzed porous carbon electrodes (having an active area of 6 sq. in. and a length 2½ in., and containing 0.5 mg./cm.$^2$ of a mixture of palladium, 20 percent rhodium 80 percent on the anode) were immersed in approximately 45 percent potassium hydroxide electrolyte and supplied with oxygen and isopropyl alcohol. The cell in a typical run, operated for 16 ampere-hours at approximately 0.75 volt. At the end of this period, the principal reaction product acetone, was obtained in an amount corresponding to 71 percent of the theoretical yield.

The actual yield would have been much higher had not part of the product been accidentally lost. Additional products, mesityl oxide and isophorone were obtained in small amounts.

Figure 2:
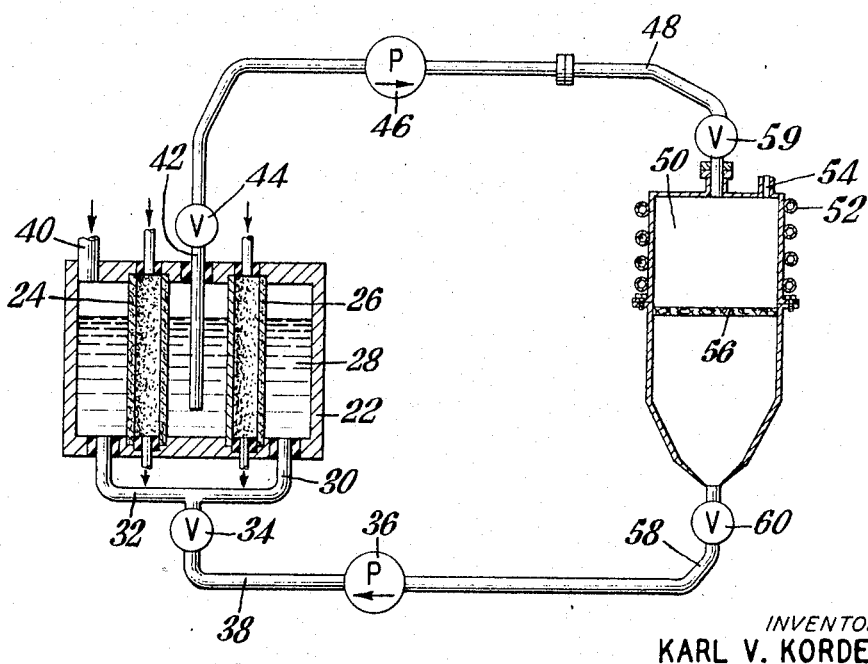
FIGURE 2 is a schematic view of another embodiment of the invention suitable for the production of solid products.

If the chemical by-product is a solid, it may be filtered or crystallized out of the aqueous electrolyte, depending upon its solubility in the electrolyte. A solid of limited electrolyte solubility can be removed by circulating the electrolyte through an external filter system. If the solid is appreciably soluble in the electrolyte, the solution thus formed can be circulated through an external cooling and filtering system whereby the solid is crystallized out of the cell to maintain continuous operation. FIGURE 2 represents a schematic diagram of a fuel cell together with an external cooling and filtering system for removal of solid products. This arrangement comprises a fuel cell consisting of a closed container 22 suitably composed of electrolyte-resistant material and having fuel electrode 24 and oxidizing electrode 26. Excess feed material is recirculated from the openings at the bottom of each cell back to the top thereof by suitable piping (not shown). Each electrode has a diminished upper section passing through the top of container 22 and is immersed in a common electrolyte 28. Pipes 30 and 32 lead from the bottom of the container and meet in valve 34 which is connected to pump 36 through pipe 38. A suitable filling port 40 for electrolyte is provided on top of container 22. Intermediate the two electrodes and extending deep into the electrolyte is pipe 42 having valve 44. This pipe serves as an outlet for electrolyte and for the reaction products, and leads to pump 46. Electrolyte and reaction products are pumped through pipe 48 to receiver 50 which is surrounded by cooling coils 52. Receiver 50 is provided with an outlet 54 for connection to a suitable pressure line. Valve 59 controls flow in pipe 48. In the center of the cooling chamber is positioned removable filter 56 which traps reaction products as they precipitate upon cooling in the cooled upper section of the receiver. Return pipe 58, equipped with valve 60 and connected to the bottom of receiver 50, serves to recirculate the purified electrolyte to the cell through pump 36. The purified electrolyte is then returned to the cell as shown.

An example of the recovery of a solid product by crystallization methods is the conversion of methanol to formic acid and subsequent recovery as potassium formate. A fuel cell was equipped with catalyzed, porous carbon electrodes prepared as described earlier (in connection with FIGURE 2) and immersed in 14 M KOH electrolyte at 84° C. The anode catalyst in this instance was composed of 80 percent Rh, 20 percent Pd in a total amount of 0.5 mg. of finely divided catalyst metal per cm.$^2$ of electrode surface area. Voltage characteristics of this cell at a current density of approximately 10 amp./ft.$^2$ were as follows:

CELL VOLTAGE, VOLTS

| Open Circuit | Closed Circuit | | | | | |
|---|---|---|---|---|---|---|
| | Immediate | 0.1 amp.-hr. | 1.0 amp.-hr. | 2.5 amp.-hr. | 13 amp.-hr. | 43 amp.-hr. |
| 1.0 | 0.94 | 0.90 | 0.86 | 0.83 | 0.79 | 0.79 |

After a 55 ampere-hour period of operation, the principal reaction product, formic acid, was obtained in the form of potassium formate dissolved in the electrolyte. The product yield as formic acid, based on the alcohol consumed electro-chemically, was about 90 percent of theoretical. On a laboratory-scale operation, the removal of the product was accomplished by passing the eletrolyte through a cation exchange resin. However, a much simpler and less expensive technique for commercial manufacture consists simply of operating the fuel cell until the formate concentration in the KOH electrolyte is as high as about 50 wt. percent, and subsequently chilling the electrolyte in place or in a separate container so that the formate precipitates out of solution. Useful power levels can be obtained even at these high concentrations of product in solution. The salt can then be converted to the acid by dissolving the potassium formate in a stronger acid such as $H_2SO_4$, and distilling off the formic acid thus liberated.

The conversion of benzyl alcohol to benzaldehyde has also been accomplished. The anode of a fuel cell as described above was supplied with benzyl alcohol and the presence of benzaldehyde in the electrolyte was subsequently observed after two ampere-hours of operation. The electrical characteristics of this cell, when operated at 65° C., were as follows:

E, volts:                                               I (amp/ft.$^2$)
  0.82                                    (Open circuit)
  0.7                                             15
  0.7                                             5

Simple distillation techniques may be employed to remove the benzaldehyde product from the electrolyte in the same manner as acetone was isolated earlier. If desired, this oxidation process may be carried to the acid and the product isolated from the alkaline electrolyte as the benzoate salt in a manner similar to that used for the recovery of potassium formate.

Figure 3:
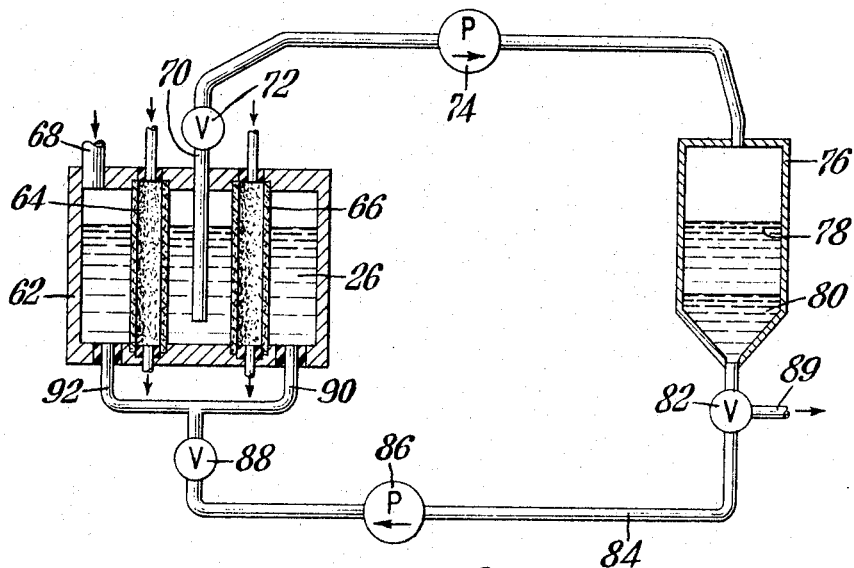
FIGURE 3 is a schematic view of a further embodiment of the invention suitable for the production of electrolyte-immiscible products.

A liquid by-product which is immiscible with the aqueous electrolyte can be removed by means of a separatory funnel arrangement. The cell container may be fitted with appropriate outlets near the top or bottom, depending on the density of the product relative to the electrolyte. A more suitable approach may involve circulating the electrolyte to an external container where the liquid product is separated and removed. FIGURE 3 is a schematic diagram representing a suitable circulation and separation apparatus. This apparatus comprises a fuel cell element having a container 62 holding a fuel electrode 64 through the top of which fuel is passed and an oxidant electrode 66 through the top of which is passed an oxidant such as oxygen, air, or chlorine gas. An electrolyte filling port 68 is provided on top of the container. A pipe 70 provided with valve 72 extends in container 62 between electrodes 64 and 66 and serves for the removal of electrolyte and of the reaction products. Pipe 70 is connected to pump 74 and leads into settling tank 76, which affords a means of separating lighter liquid 78 from heavier liquid 80. At the bottom of settling tank 76 is provided a valve 82 and a take-off duct 89 for removing the desired product. Valve 82 also communicates with cell container 62 through pipe 84, pump 86, valve 88 and pipes 90 and 92 to return electrolyte thereto.

An example of the production of a liquid by-product which is immiscible with the aqueous electrolyte, is afforded by the conversion of cyclohexane to benzene. A fuel cell utilizing catalyzed, porous carbon electrodes as described in connection with FIGURE 3 and an aqueous KOH electrolyte, was operated at about 100° C. with oxygen supplied to the cathode and cyclohexane supplied to the anode. The cell delivered approximately 10 ma./cm.$^2$ at 0.7 volt. The presence of the product, benzene, was observed in the electrolyte; however, the quantitative yield was not determined. Removal of this product is accomplished by separation of the light, immiscible benzene from the aqueous electrolyte, e.g., with a device such as that shown in FIGURE 3.

The conversion of cyclohexane to benzene and power production therefrom can be made much more efficient by operating the fuel cell at a higher temperature. For example, a cell as described above, supplied with oxygen and cyclohexane, and operating at 230° C., delivered 100 ma. at 0.75 volt. Again the actual yield of benzene was not determined but would be expected to be greater than that from the 100° C. reaction. (It should be noted that operation at 230° C. would classify this cell as a medium temperature fuel cell rather than a low temperature cell as is described throughout this discussion.)

Another example of conversion of a hydrocarbon compound is the dehydrogenation of deca- and tetrahydronapthalene (Decalin and tetralin). Decalin can be converted to tetralin or to naphthalene or mixtures thereof. Since the physical properties of Decalin and tetralin are quite similar, these two are difficult to separate if the Decalin is incompletely converted. Thus, if Decalin is the fuel, it is preferable to recirculate the product, tetralin, together with any unused Decalin to the fuel electrode for more complete conversion to naphthalene. The latter is a solid material, insoluble in aqueous electrolyte, and can be removed in much the same manner as the potassium formate product described earlier. Fuel cells (operated at room temperature) having aqueous KOH electrolyte and catalyzed, porous carbon electrodes [Co-Al spinel on the cathode; 0.5 mg./cm.$^2$ of Rh (80%)-Pd (20%) on the anode] and supplied with oxygen as the oxidizing agent, and either Decalin or tetralin as the fuel, gave currents in the milliampere range at about 0.7 volt.

Additional examples of the practice of this invention include the preparation of halogenated hydrocarbons, specifically chlorinated derivatives of ethane and propane. Fuel cells were constructed with catalyzed porous carbon electrodes (cathode catalyst, Co-Al spinel as described earlier; anode catalyst, 2 mg./cm.$^2$ finely divided platinum) and saturated ammonium chloride electrolyte. Gaseous chlorine was supplied to the cathode. Methanol and ethanol were supplied to the anodes. These cells were operated at room temperatures at above 0.8 volt at a current drain of 10 ma./cm.$^2$, and produced volatile chlorinated derivatives, recognizable by odor, of the respective alcohol fuels.

Hydrogen peroxide is a well known by-product formed during the operating of a hydrogen-oxygen fuel cell employing aqueous alkaline electrolyte. In fact, several methods for decomposing the peroxide have been described in both technical and patent literature since the presence of the peroxide often harms the hydrogen electrode. As shown below, it is possible with the present means to produce useful electrical power from a fuel cell and to recover useful quantities of the peroxide product thus formed. Carbon or metal hydrogen electrodes may be employed in such a cell.

A diaphragmed cell constructed of a porous, activated carbon cathode (supplied with oxygen) and a nickel anode immersed in 1 N NaOH electrolyte was operated at a current drain of 20 ampere/ft.$^2$ with less than 0.4 volt polarization. The cathode, in this instance, was given the normal activation treatment to render its surface properly active with the exception that the application of peroxide decomposition catalysts was necessarily omitted. After 170 hours of operation at about 10°–15° C., 85 percent of the theoretically predicted quantity of peroxide was recovered. Since the bulk of the $H_2O_2$ formed tends to accumulate in the bottom of the cell unless otherwise disturbed, the product is easily drained from an opening in the cell container bottom. Distillation techniques can then be employed to concentrate the product, if necessary. Also, if desired, the alkaline electrolyte containing $H_2O_2$ mixed therein may be removed and utilized directly for such purposes as commercial bleaching processes. (See U.S. Patent No. 2,093,989, E. Berl.) The efficiency of $H_2O_2$ production can be regulated by proper selection of the carbon electrode material and the NaOH strength reestablished by use of a sodium amalgam electrode in place of the $H_2$-fuel electrode, if so desired.

In an earlier application (U.S. Serial No. 764,359; K. Kordesch) a fuel cell utilizing an aqueous HCl solution, gaseous hydrogen fuel and gaseous chlorine as the oxidant was described. The product of this electrochemical reaction is HCl which can be isolated as a valuable by-product. Beyond a certain concentration of HCl in aqueous solution, evolution of excess HCl gas occurs. This concentration, at room temperature and atmospheric pressure, is about 12 M. At higher temperatures, the concentration would be much lower. A gas escape port can be provided in the upper part of the fuel cell and the HCl drawn off and collected. Operating characteristics of a typical cell were as follows:

| Current density, ma./cm.$^2$: | Cell voltage |
|---|---|
| 10 | 1.25 |
| 20 | 1.22 |
| 30 | 1.20 |
| 50 | 1.15 |
| 100 | 1.10 |

The presence of excess HCl was obvious; however, the total quantity produced was not calculated.

All of the foregoing examples have related to the oxidation of a fuel and separation of the oxidation product thus obtained. However, the reduction of an organic compound, for example, can be accomplished according to this invention with the production of power and isolation of the chemical end products.

As a specific example of the above variation, hexachloromelamine was converted to melamine and trichloromelamine. The reactant was reduced at a porous, electrically conductive uncatalyzed graphite cathode vs. magnesium anode (the latter used as a reference electrode) immersed in saturated KCl electrolyte. The yields of the principal products, melamine and its trichloro-derivative, were 20 percent and seventeen percent, respectively, based on the amount of reactant.

Another cell was constructed using a porous, Pt-catalyed carbon anode supplied with gaseous hydrogen fuel instead of the Mg reference eelctrode above. Hexachloromelamine was again supplied to a conductive porous carbon electrode in KCl electrolyte. (Spinel was present on this electrode but is *not* necessary.) This cell was operated at room temperature for short periods of 130 minutes at 0.81 volt at a current density of 10 amp/ft.$^2$, and for 62 minutes at 0.77 volt at a current density of 20 amp/ft.$^2$. The principal product was identified as melamine.

Further tests were run with a fuel cell consisting of a porous graphite (uncatalyzed) cathode supplied with hexachloromelamine; and a porous, catalyzed with 2 mg. of platinum per square centimeter, supplied with hydrogen fuel. The electrolyte in run No. 1 was saturated KCl acidified with HCl to a concentration of 1 N and in run No. 2 was saturated KCl. Cell operating characteristics at 48° C. were as follows:

| C.D., amp/ft.$^2$ | Cell Voltage, Volts | |
|---|---|---|
| | No. 1 | No. 2 |
| 1.5 | 1.14 | 1.12 |
| 3.0 | 1.04 | 1.08 |
| 4.0 | .94 | .94 |
| 5.5 | .80 | .78 |
| 7.0 | .65 | .68 |
| 8.5 | .47 | .51 |

The reduction of m-dinitrobenzene can be carried in a similar manner. For example, a fuel cell was set up with 2 M $NH_4Cl$ electrolyte and catalyzed, porous carbon electrodes. The anode catalyst was 2 mg. Pt/cm.$^2$. The oxidant, m-dinitrobenzene, was dissolved in an aqueous alcohol solution (100 cc. 95% ethanol and 200 cc. water) and supplied in this form to the cathode. The anode fuel was gaseous hydrogen. The cell was operated at a current density of 15 amp/ft.$^2$ at 0.35 volt for a short period of 84.2 minutes. The major product was identified as 3,3'-dinitroazoxybenzene. Later tests established a yield of 30% of this product based upon the amount of starting material. Small amounts of m-phenylene diamine were also identified.

Brief tests were run using tetrachloroquinone (chloranil) as the oxidant. A cell as described above using carbon electrodes and a chloride electrolyte was operated for 2 hours at a current density of about 1 amp/ft.$^2$ and a voltage of about .2 to .3 volt. The oxidant was converted to tetrachlorohydroquinone. The actual yield was not determined, however. Since the quinone-hydroquinone reaction is essentially a reversible one, it was desired to determine if the product formed under these conditions could be returned to its original form. The product was successfully recharged, employing air as the oxidant.

Solid oxidants such as the three compounds described immediately above can be supplied to the cathode in one of several ways. The dry powdered solid can be placed in the interior of a hollow electrode and electrolyte pumped through the electrode walls to carry the chemical to the interface where electrochemical reaction occurs. A slurry of the finely-powered solid in a carrier solution or in the cell electrolyte, can be substituted to provide a more continuous supply. Best results are obtained with a solution of the oxidant dissolved in a suitable solvent.

In this version of the invention, as in the others, it is possible to control the degree of oxidation of the fuel and hence the nature of the products, by regulating the amount of current produced by the fuel cell. This in turn can be achieved in various ways, such as by varying the rate of flow of the fuel or of the oxidant or of both.

It has thus been shown that there has been provided by this invention, apparatus by means of which the various objects hereinabove set forth, together with many thoroughly practical advantages are successfully achieved.

What is claimed is:

1. A method for producing organic chemical compounds from two reactants while obtaining useful electrical power during the reaction, which method comprises: providing a fuel cell comprising a fuel electrode, an oxidant electrode and an aqueous electrolyte in electrochemical relationship therewith; supplying one of said reactants as a fuel to said fuel electrode and the second of said reactants as an oxidant to said oxidant electrode, and withdrawing electrical energy from said cell thereby forming electrochemically said organic chemical compound as a product of reaction in said electrolyte; and recovering said organic chemical compound from said electrolyte; said fuel and oxidant reactants being selected from one of the following groups; (a) a fuel selected from the group consisting of hydrocarbons and alcohols and an oxidant selected from the group consisting of oxygen and chlorine, and (b) hydrogen fuel and as an oxidant a reducible compound selected from the group consisting of quinonic, N-halogen and aromatic nitro organic compounds; said fuel electrode comprising activated porous carbon at least on the active surface thereof and a catalyst selected from the group consisting of platinum, rhodium, iridium, palladium, ruthenium and mixtures thereof, and said oxidant electrode comprising activated porous carbon at least on the active surface thereof and a spinel catalyst.

2. A method for producing organic chemical compounds containing carbonyl groups while obtaining useful electrical power during the reaction, which method comprises: providing a fuel cell comprising a fuel electrode, an oxidant electrode and an aqueous electrolyte in electrochemical relationship therewith, supplying an alcohol as a fuel to said fuel electrode and oxygen to said oxidant electrode, and withdrawing electrical energy from said cell thereby forming electrochemically said organic chemical compound as a product of reaction in said electrolyte; and recovering said organic chemical compound from said electrolyte; said fuel electrode comprising activated porous carbon at least on the active surface thereof and a catalyst selected from the group consisting of platinum, rhodium, iridium, palladium, ruthenium and mixtures thereof, and said oxidant electrode comprising activated porous carbon at least on the active surface thereof and a spinel catalyst.

3. A method for producing dehydrogenated derivatives of hydrocarbons while obtaining useful electrical power during the reaction, which method comprises: providing a fuel cell comprising a fuel electrode, an oxidant electrode and an aqueous electrolyte in electrochemical relationship therewith; supplying a hydrocarbon as a fuel to said fuel electrode and oxygen to said oxidant electrode, and withdrawing electrical energy from said cell thereby forming electrochemically said dehydrogenated derivative as a product of reaction in said electrolyte; and recovering said dehydrogenated hydrocarbon from said electrolyte; said fuel electrode comprising activated porous carbon at least on the active surface thereof and a catalyst selected from the group consisting of platinum, rhodium, iridium, palladium, ruthenium and mixtures thereof, and said oxidant electrode comprising activated porous carbon at least on the active surface thereof and a spinel catalyst.

4. A method for producing halogenated hydrocarbons while obtaining useful electrical power during the reaction, which method comprises: providing a fuel cell comprising a fuel electrode, an oxidant electrode and an aqueous electrolyte in electrochemical relationship therewith, supplying an alcohol as a fuel to said fuel electrode and chlorine to said oxidant electrode, and withdrawing electrical energy from said cell thereby forming electrochemically said halogenated hydrocarbon as a product of reaction in said electrolyte; and recovering said halogenated hydrocarbon from said electrolyte; said fuel electrode comprising activated porous carbon at least on the active surface thereof and a catalyst selected from the group consisting of platinum, rhodium, iridium, palladium, ruthenium and mixtures thereof, and said oxidant electrode comprising activated porous carbon at least on the active surface thereof and a spinel catalyst.

5. A method for producing acetone while obtaining useful electrical power during the reaction, which method comprises: providing a fuel cell comprising a fuel electrode, an oxidant electrode and an aqueous electrolyte in electrochemical relationship therewith, supplying isopropyl alcohol as a fuel to said fuel electrode and oxygen to said oxidant electrode, and withdrawing electrical energy from said cell thereby forming acetone electrochemically as a product of reaction in said electrolyte; and recovering acetone from said electrolyte; said fuel electrode comprising activated porous carbon at least on the active surface thereof and a catalyst selected from the group consisting of platinum, rhodium, iridium, palladium, ruthenium and mixtures thereof; and said oxidant electrode comprising activated porous carbon at least on the active surface thereof and a spinel catalyst.

6. A method for producing benzaldehyde while obtaining useful electrical power during the reaction, which method comprises: providing a fuel cell comprising a fuel electrode, an oxidant electrode and an aqueous electrolyte in electrochemical relationship therewith; supplying benzyl alcohol as a fuel to said fuel electrode and oxygen to said oxidant electrode, and withdrawing electrical energy from said cell thereby forming benzaldehyde electrochemically as a product of reaction in said electrolyte; and recovering benzaldehyde from said electrolyte; said fuel electrode comprising activated porous carbon at least on the active surface thereof and a catalyst selected from the group consisting of platinum, rhodium, iridium, palladium, ruthenium and mixtures thereof; and said oxidant electrode comprising activated porous carbon at least on the active surface thereof and a spinel catalyst.

References Cited by the Examiner

UNITED STATES PATENTS

| | | | |
|---|---|---|---|
| 1,951,280 | 3/1934 | Hale et al. | 136—86 |
| 2,130,813 | 9/1938 | Ohman | 204—80 |
| 2,175,523 | 10/1939 | Greger | 136—142 |
| 2,384,463 | 9/1945 | Gunn et al. | 136—86 |
| 2,669,598 | 2/1954 | Marko et al. | 136—122 |
| 2,921,110 | 1/1960 | Crowley et al. | 136—86 |
| 2,925,454 | 2/1960 | Justi et al. | 136—86 |
| 2,925,455 | 2/1960 | Eidensohn et al. | 136—86 |
| 2,938,064 | 5/1960 | Kordesch | 136—86 |
| 2,976,342 | 3/1961 | Morehouse et al. | 136—86 |
| 3,002,039 | 9/1961 | Bacon | 136—86 |
| 3,014,976 | 12/1961 | Blackmer | 136—86 |
| 3,077,507 | 2/1963 | Kordesch et al. | 136—86 |
| 3,080,442 | 3/1963 | Hobert | 136—86 |
| 3,088,990 | 5/1963 | Rightmire et al. | 136—86 |
| 3,103,473 | 9/1963 | Juda | 204—74 |
| 3,124,520 | 3/1964 | Juda | 204—129 |
| 3,125,468 | 3/1964 | Thompson et al. | 136—86 |

OTHER REFERENCES

Hunger et al., "Proc. of Power Source Conf.," Apr. 13, 1959, pp. 105–108.

Wynn, "Proc. 14th Ann. Power Sources Conf.," May 1960, pp. 52–55.

Heise, "Transactions of the Electrochemical Society," vol. 75, 1939, pp. 147–166.

JOHN H. MACK, *Primary Examiner.*

JOHN R. SPECK, MURRAY TILLMAN, WINSTON A. DOUGLAS, T. H. TUNG, *Assistant Examiners.*